United States Patent
Koreeda

(10) Patent No.: US 9,664,881 B2
(45) Date of Patent: May 30, 2017

(54) IMAGING OPTICAL SYSTEM

(71) Applicant: HOYA CORPORATION, Tokyo (JP)

(72) Inventor: Daisuke Koreeda, Saitama (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 14/879,624

(22) Filed: Oct. 9, 2015

(65) Prior Publication Data
US 2016/0124192 A1    May 5, 2016

(30) Foreign Application Priority Data
Nov. 4, 2014   (JP) ................. 2014-224172

(51) Int. Cl.
| G02B 13/18 | (2006.01) |
| G02B 3/02 | (2006.01) |
| G02B 9/62 | (2006.01) |
| G02B 13/00 | (2006.01) |
| G02B 27/00 | (2006.01) |

(52) U.S. Cl.
CPC ..... G02B 13/0045 (2013.01); G02B 27/0025 (2013.01)

(58) Field of Classification Search
CPC .............................. G02B 13/0045; G02B 9/62
USPC .................... 359/713, 752, 756, 757
See application file for complete search history.

(56) References Cited

U.S. PATENT DOCUMENTS

| 6,934,089 B1 * | 8/2005 | Kallo ................... G02B 9/12 359/661 |
| 2013/0120858 A1 | 5/2013 | Sano |
| 2013/0314804 A1 | 11/2013 | Kubota et al. |
| 2014/0063616 A1 | 3/2014 | Okano et al. |
| 2014/0071542 A1 | 3/2014 | Jung et al. |
| 2014/0320981 A1 * | 10/2014 | Hsieh ................. G02B 13/0045 359/713 |
| 2015/0268448 A1 * | 9/2015 | Kubota .................... G02B 9/64 359/755 |

FOREIGN PATENT DOCUMENTS

| JP | 2013-242449 | 12/2013 |
| JP | 2014-44373 | 3/2014 |
| JP | 2014-52635 | 3/2014 |
| WO | 2012/008357 | 1/2012 |

* cited by examiner

*Primary Examiner* — William Choi
(74) *Attorney, Agent, or Firm* — Greenblum & Bernstein, P.L.C.

(57) ABSTRACT

An imaging optical system includes a positive first lens element having a convex surface on the object side, a negative second lens element having a concave surface on the image side, a third lens element, a positive fourth lens element, a fifth lens element, and a negative sixth lens element provided with at least one aspherical surface that has inflection points other than at an optical axis thereof. The following conditions (1) and (2) are satisfied:

$$0.86 < f/f12 < 1.20 \quad (1), \text{ and}$$

$$-0.71 < (r11-r12)/(r11+r12) < -0.20 \quad (2),$$

wherein f designates the focal length of the imaging optical system, f12 designates the combined focal length of the first and second lens elements, and r11 and r12 designate the radius of curvatures of surfaces on the object side and image side of the first lens element, respectively.

11 Claims, 6 Drawing Sheets

FNO.=1:2.0

—— d Line
------ g Line
— — C Line

-0.2  0.2
SPHERICAL
ABERRATION
CHROMATIC
ABERRATION

Y=3.80

-0.01  0.01
LATERAL
CHROMATIC
ABERRATION

Y=3.80

—— S
----- M

-0.2  0.2
ASTIGMATISM

Y=3.80

-5.0  5.0 %
DISTORTION

Fig. 3
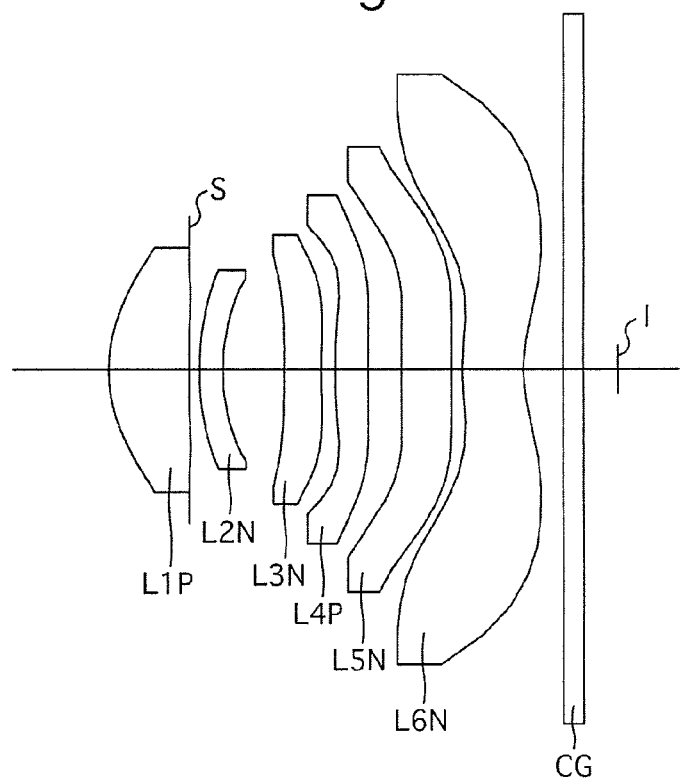
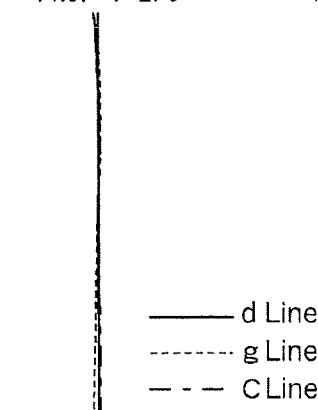
Fig. 4A
FNO.=1:2.0
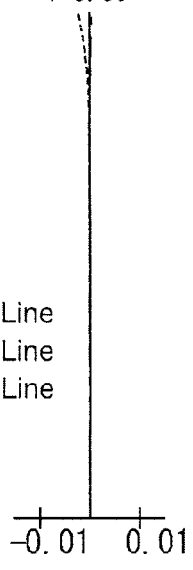
-0.2   0.2
SPHERICAL
ABERRATION
CHROMATIC
ABERRATION
—— d Line
------- g Line
— — C Line
Fig. 4B
Y=3.80
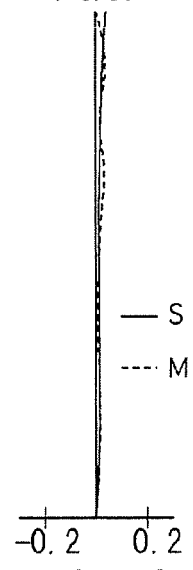
-0.01   0.01
LATERAL
CHROMATIC
ABERRATION
Fig. 4C
Y=3.80
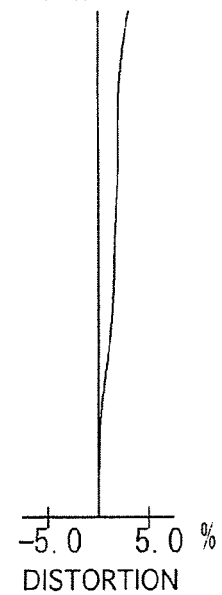
-0.2   0.2
ASTIGMATISM
—— S
---- M
Fig. 4D
Y=3.80
-5.0   5.0 %
DISTORTION

FNO.=1:2.2

—— d Line
------ g Line
— — C Line

-0.2  0.2
SPHERICAL
ABERRATION
CHROMATIC
ABERRATION

Y=3.80

-0.01  0.01
LATERAL
CHROMATIC
ABERRATION

Y=3.80

—— S
---- M

-0.2  0.2
ASTIGMATISM

Y=3.80

-5.0  5.0 %
DISTORTION

FNO.=1:2.0

-0.2    0.2
SPHERICAL
ABERRATION
CHROMATIC
ABERRATION

― d Line
------- g Line
― ― C Line

Y=3.80

-0.01   0.01
LATERAL
CHROMATIC
ABERRATION

Y=3.80

-0.2    0.2
ASTIGMATISM

― S
--- M

Y=3.80

-5.0    5.0 %
DISTORTION

IMAGING OPTICAL SYSTEM

BACKGROUND OF THE INVENTION

1. Field of the Invention

The present invention relates to an imaging optical system, e.g., an imaging optical system that is installed in a mobile device (a smart phone, etc.) having a built-in camera.

2. Description of Related Art

Patent Literature Nos. 1 through 4 each disclose an imaging optical system installed in, e.g., a mobile device, having a built-in camera, which provides an f-number of approximately 2.0 through 2.4 and a half angle-of-view of 35 degrees.

The imaging optical system in each of Patent Literature Nos. 1 through 4 has a configuration of six lens elements, in which a positive lens element is provided closest to the object side, and a positive lens element or a negative lens element that has an aspherical surface having inflection points other than at the optical axis (at positions other than at an intersection point of the optical axis) is provided closest to the image side.

Patent Literature 1: Japanese Unexamined Patent Application No. 2014-44373

Patent Literature 2: Japanese Unexamined Patent Application No. 2014-52635

Patent Literature 3: Japanese Unexamined Patent Application No. 2013-242449

Patent Literature 4: Pamphlet of International Publication No. 2012/8357

However, since the imaging optical system in each of Patent Literature Nos. 1 through 4 has an inappropriate lens profile or refractive power in the positive lens element provided closest to the object side (and also an inappropriate refractive power balance between this positive lens element and the other lens elements), miniaturization (slimming down) of the imaging optical system is difficult, and there is a problem with the correction of abaxial aberration such as coma, etc., being insufficient. In particular, the slimming down of mobile devices having a built-in camera has gained considerable momentum, thereby demanding miniaturization (slimming down) of the imaging optical system to the utmost limit.

SUMMARY OF THE INVENTION

The present invention has been devised in view of the above-mentioned problems, and provides an imaging optical system having an f-number of approximately 2.0 which enables a large amount of light to be collected, has a half angle-of-view of 35 degrees or more, can favorably correct abaxial aberration such as coma, and can meet the demands for miniaturization (slimming down).

According to an aspect of the present invention, an imaging optical system is provided, including a positive first lens element having a convex surface on the object side, a negative second lens element having a concave surface on the image side, a third lens element, a positive fourth lens element, a fifth lens element, and a negative sixth lens element provided with at least one aspherical surface that has inflection points other than at an optical axis thereof, in that order from the object side. The following conditions (1) and (2) are satisfied:

$$0.86 < f/f12 < 1.20 \quad (1), \text{ and}$$

$$-0.71 < (r11-r12)/(r11+r12) < -0.20 \quad (2),$$

wherein f designates the focal length of the imaging optical system, f12 designates the combined focal length of the first lens element and the second lens element, r11 designates the radius of curvature of a surface on the object side of the first lens element, and r12 designates the radius of curvature of a surface on the image side of the first lens element.

It is desirable for the following condition (3) to be satisfied:

$$-0.45 < f1/f2 < -0.10 \quad (3),$$

wherein f1 designates the focal length of the first lens element, and f2 designates the focal length of the second lens element.

It is desirable for the following condition (4) to be satisfied:

$$0.05 < (r21-r22)/(r21+r22) < 0.30 \quad (4),$$

wherein r21 designates the radius of curvature of a surface on the object side of the second lens element, and r22 designates the radius of curvature of a surface on the image side of the second lens element.

It is desirable for the following condition (5) to be satisfied:

$$n2 > 1.8 \quad (5),$$

wherein n2 designates the refractive index at the d-line of the second lens element.

It is desirable for the following condition (6) to be satisfied:

$$35 < vd1 - vd2 < 80 \quad (6),$$

wherein vd1 designates the Abbe number with respect to the d-line of the first lens element, and vd2 designates the Abbe number with respect to the d-line of the second lens element.

It is desirable for the following condition (7) to be satisfied:

$$vd1 > 60 \quad (7),$$

wherein vd1 designates the Abbe number with respect to the d-line of the first lens element.

It is desirable for the following condition (8) to be satisfied:

$$-2.5 < f/f6 < -0.4 \quad (8),$$

wherein f designates the focal length of the imaging optical system, and f6 designates the focal length of the sixth lens element.

It is desirable for the following condition (9) to be satisfied:

$$0.05 < d6/f < 0.18 \quad (9),$$

wherein d6 designates the lens thickness of the sixth lens element, and f designates the focal length of the imaging optical system.

It is desirable for the following condition (10) to be satisfied:

$$0.15 < f/f4 < 0.55 \quad (10),$$

wherein f designates the focal length of the imaging optical system, and f4 designates the focal length of the fourth lens element.

It is desirable for the following condition (11) to be satisfied:

$$0.1 < d23/f < 0.2 \quad (11),$$

wherein d23 designates the distance between the second lens element and the third lens element, and f designates the focal length of the imaging optical system.

In the imaging optical system, a glass molded lens element, on which an aspherical surface is formed on each side, can be provided at the object side, and a plastic lens element, on which an aspherical surface is formed on each side, can be provided at the image side. For example, the first lens element can be a glass molded lens element, on which an aspherical surface is formed on each side, and each of the second through sixth lens elements can be a plastic lens element, on which an aspherical surface is formed on each side. As an alternative example, it is desirable for each of the first lens element and the second lens element to be a glass molded lens element, on which an aspherical surface is formed on each side, and each of the third through sixth lens elements to be a plastic lens element, on which an aspherical surface is formed on each side.

It is desirable for the following condition (12) to be satisfied:

$$TL/(2*Ymax)<0.75 \tag{12}$$

wherein TL designates the distance from the surface on the object side of the first lens element to the imaging plane, and Ymax designates the maximum image height.

According to the present invention, an imaging optical system is provided, having an f-number of approximately 2.0 which enables a large amount quantity of light to be collected, a half angle-of-view of 35 degrees or more, can favorably correct abaxial aberration such as coma, and can meet the demands for miniaturization (slimming down).

The present disclosure relates to subject matter contained in Japanese Patent Application No. 2014-224172 (filed on Nov. 4, 2014) which is expressly incorporated herein in its entirety.

BRIEF DESCRIPTION OF THE DRAWINGS

The present invention will be discussed below in detail with reference to the accompanying drawings, in which:

FIG. 3 shows a lens arrangement of a second numerical embodiment of the imaging optical system;

FIGS. 4A, 4B, 4C and 4D show various aberrations that occurred in the lens arrangement of FIG. 3;

FIG. 9 shows a lens arrangement of a fifth numerical embodiment of the imaging optical system;

FIGS. 10A, 10B, 10O and 10D show various aberrations that occurred in the lens arrangement of FIG. 9;

DESCRIPTION OF THE EMBODIMENTS

Figure 1:
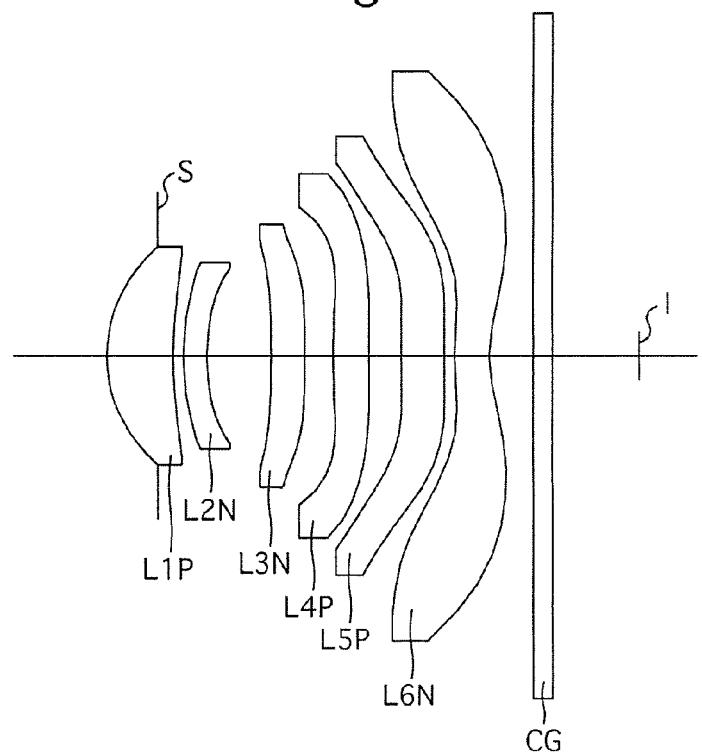
FIG. 1 shows a lens arrangement of a first numerical embodiment of the imaging optical system.

As shown in the lens arrangements of FIGS. 1, 3, 5, 7, 9 and 11, the imaging optical system of the illustrated embodiments is configured of a positive first lens element L1P having a convex surface on the object side (a positive meniscus lens element having a convex surface on the object side), a negative second lens element L2N having a concave surface on the image side (negative meniscus lens element having a convex surface on the object side), a positive third lens element L3P or a negative third lens element L3N, a positive fourth lens element L4P, a positive fifth lens element L5P or a negative fifth lens element L5N, and a negative sixth lens element L6N, in that order from the object side (a total of six lens elements).

In the first through third, fifth and sixth numerical embodiments, each of the first lens element L1P and the second lens element L2N is formed of a glass molded lens element having an aspherical surface on both sides thereof, and each of the remaining lens elements (third through sixth lens elements) is formed of a plastic lens element having an aspherical surface on both sides thereof. In the fourth numerical embodiment, only the first lens element L1P is formed as a glass molded lens element having an aspherical surface on both sides thereof, and each of the remaining lens elements (second through sixth lens elements) is formed of a plastic lens element having an aspherical surface on both sides thereof. Accordingly, by forming at least the first lens element LIP as a glass molded lens element having an aspherical surface on both sides thereof, deterioration in optical quality occurring due to temperature change can be suppressed.

In the illustrated embodiments of the imaging optical system, the aspherical surfaces on the sixth lens element L6N has inflection points other than at the optical axis (at positions other than at an intersection point of the optical axis).

In the illustrated embodiments of the imaging optical system, a cover glass CG for protecting the imaging surface (imaging plane) I of an image sensor (not shown) is provided behind the sixth lens element L6N.

In each of the first and third through sixth numerical embodiments, a diaphragm S is provided on the periphery of the first lens element L1P and overlaps the first lens element L1P with respect to the optical axis direction. In the second numerical embodiment, a diaphragm S is provided on a plane that is orthogonal to the optical axis and contacts the surface of the first lens element L1P on the image side.

The imaging optical system of the illustrated embodiments is configured of a positive first lens element L1P having a convex surface on the object side (a positive meniscus lens element having a convex surface on the object side), a negative second lens element L2N having a concave surface on the image side (negative meniscus lens element having a convex surface on the object side), a third lens element (L3P or L3N), a positive fourth lens element L4P, a fifth lens element (L5P or L5N), and a negative sixth lens element L6N having an aspherical surface, on both sides, including inflection points other than at the optical axis (at positions other than at an intersection point of the optical axis), in that order from the object side. Note that it is possible for an aspherical surface that includes inflection points other than at the optical axis (at positions other than at an intersection point of the optical axis) to be formed only on one side of the sixth lens element L6N.

Accordingly, the imaging optical system of the illustrated embodiments is configured of six lens elements.

Furthermore, by appropriately setting the profile of the first lens element L1P, which is provided closest to the object side, and the refractive powers of the first lens element L1P and the second lens element L2N (and the balance of refractive power with the remaining lens elements), an imaging optical system having an f-number of approximately 2.0 which enables a large amount of light to be collected, which has a half angle-of-view of 35 degrees or more, which can favorably correct abaxial aberration such as coma, and can meet the demands for miniaturization (slimming down) can be successfully achieved. Hence, the imaging optical system of the present invention is suitable for use in, e.g., a mobile device (a smart phone, etc.) having a built-in camera, in which miniaturization (slimming down) of the imaging optical system to the utmost limit is demanded.

Condition (1) specifies the ratio of the focal length of the imaging optical system to the combined focal length of the first lens element L1P and the second lens element L2N. By satisfying condition (1), abaxial aberration such as coma can be favorably corrected, and the imaging optical system (and in turn the entire apparatus onto which the imaging optical system is installed) can be miniaturized (slimmed down).

If the upper limit of condition (1) is exceeded, the combined refractive power of the first lens element L1P and the second lens element L2N becomes too large, so that correcting abaxial aberration such as coma, etc., becomes difficult.

If the lower limit of condition (1) is exceeded, the combined refractive power of the first lens element L1P and the second lens element L2N becomes too small, so that it becomes difficult to miniaturize (slim down) the imaging optical system (and in turn the entire apparatus onto which the imaging optical system is installed).

Condition (2) specifies the profile (shape factor) of the first lens element L1P. By satisfying condition (2), abaxial aberration such as coma, etc., can be favorably corrected, and the imaging optical system (and in turn the entire apparatus onto which the imaging optical system is installed) can be miniaturized (slimmed down).

If the upper limit of condition (2) is exceeded, the radius of curvature of the surface on the object side of the first lens element L1P becomes too small, so that it becomes difficult to favorably correct abaxial aberration such as coma, etc.

If the lower limit of condition (2) is exceeded, the radius of curvature of the surface on the object side of the first lens element L1P becomes too large, so that it becomes difficult to miniaturize (slim down) the imaging optical system (and in turn the entire apparatus onto which the imaging optical system is installed).

Condition (3) specifies the balance of the refractive power between the first lens element L1P and the second lens element L2N. By satisfying condition (3), abaxial aberration such as coma, etc., can be favorably corrected, and the imaging optical system (and in turn the entire apparatus onto which the imaging optical system is installed) can be miniaturized (slimmed down).

If the upper limit of condition (3) is exceeded, the refractive power of the first lens element L1P becomes too strong, so that it becomes difficult to favorably correct abaxial aberration such as coma, etc.

If the lower limit of condition (3) is exceeded, the refractive power of the first lens element L1P becomes too weak, so that it becomes difficult to miniaturize (slim down) the imaging optical system (and in turn the entire apparatus onto which the imaging optical system is installed).

Condition (4) specifies the profile (shape factor) of the second lens element L2N. By satisfying condition (4), abaxial aberration such as coma, etc., can be favorably corrected, and the imaging optical system (and in turn the entire apparatus onto which the imaging optical system is installed) can be miniaturized (slimmed down).

If the upper limit of condition (4) is exceeded, the radius of curvature of the surface on the image side of the second lens element L2N becomes too small, so that it becomes difficult to favorably correct abaxial aberration such as coma, etc.

If the lower limit of condition (4) is exceeded, the radius of curvature of the surface on the image side of the second lens element L2N becomes too large, so that it becomes difficult to miniaturize (slim down) the imaging optical system (and in turn the entire apparatus onto which the imaging optical system is installed).

Condition (5) specifies the refractive index at the d-line of the second lens element L2N. By satisfying condition (5), abaxial aberration such as coma, etc., can be favorably corrected.

If the lower limit of condition (5) is exceeded, the refractive index at the d-line of the second lens element L2N becomes too small, so that it becomes difficult to favorably correct abaxial aberration such as coma, etc.

Condition (6) specifies the difference in Abbe number with respect to the d-line between the first lens element L1P and the second lens element L2N. By satisfying condition (6), axial chromatic aberration can be favorably corrected.

If the upper limit of condition (6) is exceeded, the axial chromatic aberration becomes overcorrected.

If the lower limit of condition (6) is exceeded, the axial chromatic aberration becomes undercorrected.

Condition (7) specifies the Abbe number with respect to the d-line of the first lens element L1P. By satisfying condition (7), axial chromatic aberration can be favorably corrected.

If the lower limit of condition (7) is exceeded, axial chromatic aberration becomes undercorrected.

Condition (8) specifies the ratio of the focal length of the imaging optical system to the focal length of the sixth lens element L6N. By satisfying condition (8), the telecentric angle and especially abaxial aberrations such as distortion can be favorably corrected, and the imaging optical system (and in turn the entire apparatus onto which the imaging optical system is installed) can be miniaturized (slimmed down).

If the upper limit of condition (8) is exceeded, the refractive power of the sixth lens element L6N becomes too weak, so that it becomes difficult to miniaturize (slim down) the imaging optical system (and in turn the entire apparatus onto which the imaging optical system is installed).

If the lower limit of condition (8) is exceeded, the refractive power of the sixth lens element L6N becomes too strong, so that it becomes difficult to correct the telecentric angle and especially abaxial aberrations, such as distortion.

Condition (9) specifies the ratio of the thickness of the sixth lens element L6N (the distance along the optical axis from the surface closest to the object side on the sixth lens element L6N to the surface closest to the image side on the sixth lens element L6N) to the focal length of the imaging optical system. By satisfying condition (9), the imaging optical system (and in turn the entire apparatus onto which the imaging optical system is installed) can be miniaturized (slimmed down), and a sufficient amount of backfocus and edge thickness of the sixth lens element L6N can be obtained.

If the upper limit of condition (9) is exceeded, the lens thickness of the sixth lens element L6N becomes too large, so that it becomes difficult to miniaturize (slim down) the imaging optical system (and in turn the entire apparatus onto which the imaging optical system is installed), and it becomes difficult to obtain a sufficient backfocus.

If the lower limit of condition (9) is exceeded, the lens thickness of the sixth lens element L6N becomes too small, so that it becomes difficult to obtain a sufficient edge thickness of the sixth lens element L6N.

Condition (10) specifies the ratio of the focal length of the imaging optical system to the focal length of the fourth lens element L4P. By satisfying condition (10), abaxial aberration such as coma, etc., can be favorably corrected, and the imaging optical system (and in turn the entire apparatus onto which the imaging optical system is installed) can be miniaturized (slimmed down).

If the upper limit of condition (10) is exceeded, the positive refractive power of the fourth lens element L4P becomes too strong, so that it becomes difficult to correct abaxial aberration such as coma, etc.

If the lower limit of condition (10) is exceeded, the positive refractive power of the fourth lens element L4P becomes too weak, so that it becomes difficult to miniaturize (slim down) the imaging optical system (and in turn the entire apparatus onto which the imaging optical system is installed).

Condition (11) specifies the ratio of the focal length of the imaging optical system to the distance between the second lens element L2N and the third lens element (L3P or L3N). By satisfying condition (11), the imaging optical system (and in turn the entire apparatus onto which the imaging optical system is installed) can be miniaturized (slimmed down), and a sufficient space for providing a stationary diaphragm (not shown in the drawings) between the second lens element L2N and the third lens element (L3P or L3N) can be obtained. This stationary diaphragm (not shown in the drawings) is provided for the purpose of specifying the f-number and for improving the design optical quality (by reducing aberrations and cutting out ghosting), and is a separate component from the diaphragm S shown in the drawings of the illustrated embodiments.

If the upper limit of condition (11) is exceeded, the distance between the second lens element L2N and the third lens element (L3P or L3N) becomes too large, so that it becomes difficult to miniaturize (slim down) the imaging optical system (and in turn the entire apparatus onto which the imaging optical system is installed).

If the lower limit of condition (11) is exceeded, the distance between the second lens element L2N and the third lens element (L3P or L3N) becomes too small, and it becomes difficult to provide the above-mentioned stationary diaphragm, not shown in the drawings, in between the second lens element L2N and the third lens element (L3P or L3N).

Condition (12) specifies the relationship between the distance from the surface on the object side of the first lens element L1P to the imaging surface (plane) I, and the maximum image height; condition (12) indicates the extent by which the size of the imaging optical system can be reduced. By satisfying condition (12), an imaging optical system can be obtained that is suitable for use in, e.g., a mobile device (a smart phone, etc.) having a built-in camera, in which miniaturization (slimming down) of the imaging optical system to the utmost limit is demanded.

Specific first through sixth numerical embodiments will be herein discussed. In the aberration diagrams and the tables, the d-line, g-line and C-line show aberrations at their respective wave-lengths; S designates the sagittal image, M designates the meridional image, R designates the radius of curvature, D designates the lens thickness or distance between lenses, N(d) designates the refractive index at the d-line, and νd designates the Abbe number with respect to the d-line. The unit used for the various lengths is defined in millimeters (mm).

An aspherical surface which is rotationally symmetrical about the optical axis is defined as:

$$x = cy^2/(1+[1-\{1+K\}c^2y^2]^{1/2}) + A4y^4 + A6y^6 + A8y^8 + A10y^{10} + A12y^{12} \ldots$$

wherein 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, A12 designates a twelfth-order aspherical coefficient, and 'x' designates the amount of sag.

[Numerical Embodiment 1]

Figure 2A:
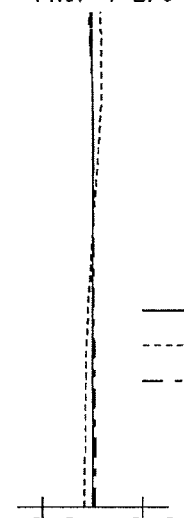
FIGS. 2A, 2B, 2C and 2D show various aberrations that occurred in the lens arrangement of FIG. 1.
Figure 2B:
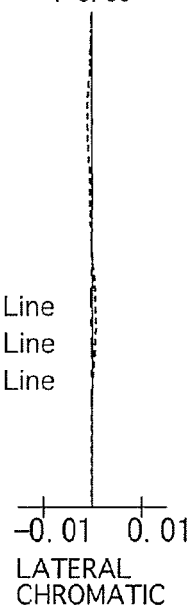
Figure 2C:
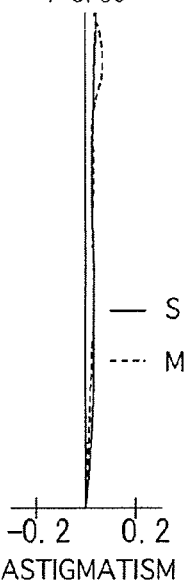
Figure 2D:
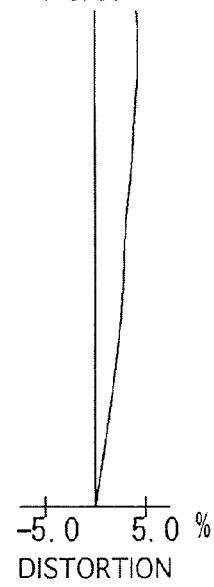

FIGS. 1 through 2D and Tables 1 through 3 show a first numerical embodiment of the imaging optical system. FIG. 1 shows a lens arrangement of the first numerical embodiment of the imaging optical system. FIGS. 2A, 2B, 2C and 2D show various aberrations that occurred in the lens arrangement shown in FIG. 1. Table 1 shows the lens surface data, Table 2 shows various data of the imaging optical system, and Table 3 shows aspherical surface data.

The imaging optical system of the first numerical embodiment is configured of a positive first lens element L1P having a convex surface on the object side (a positive meniscus lens element having a convex surface on the object side), a negative second lens element L2N having a concave surface on the image side (negative meniscus lens element having a convex surface on the object side), a negative third lens element L3N, a positive fourth lens element L4P, a positive fifth lens element L5P and a negative sixth lens element L6N, in that order from the object side. Each of the first lens element L1P and the second lens element L2N is configured of a glass molded lens element having an aspherical surface on each side thereof. Each of the third lens element L3N, the fourth lens element L4P, the fifth lens element L5P, the sixth lens element L6N is configured of a plastic lens element having an aspherical surface on each side thereof. The aspherical surfaces on the sixth lens element L6N have inflection points other than at the optical axis (at positions other than at an intersection point of the optical axis). A cover glass CG for protecting the imaging surface (plane) I of the image sensor (not shown) is provided behind the sixth lens element L6N. A diaphragm S is provided on the periphery of the first lens element L1P and overlaps the first lens element L1P with respect to the optical axis direction.

TABLE 1

LENS SURFACE DATA

| Surf. No. | R | D | N(d) | ν(d) |
|---|---|---|---|---|
| (Diaphragm) | ∞ | −0.54 | | |
| 1 | 1.554 | 0.71 | 1.49710 | 81.6 |
| 2 | 4.842 | 0.11 | | |
| 3 | 3.004 | 0.25 | 2.00178 | 19.3 |
| 4 | 2.463 | 0.71 | | |
| 5 | −39.275 | 0.37 | 1.54358 | 55.7 |
| 6 | −148.870 | 0.31 | | |
| 7 | 9.155 | 0.39 | 1.54358 | 55.7 |
| 8 | −93.000 | 0.35 | | |
| 9 | 16.313 | 0.48 | 1.63548 | 23.9 |
| 10 | 32.000 | 0.11 | | |
| 11 | 2.426 | 0.38 | 1.53484 | 55.7 |
| 12 | 1.270 | 0.48 | | |
| 13 | ∞ | 0.21 | 1.51680 | 64.2 |
| 14 | ∞ | 0.39 | | |

TABLE 2

IMAGING OPTICAL SYSTEM DATA

| | |
|---|---|
| Focal length of imaging optical system [mm]: | 4.81 |
| f-number | 2.0 |
| Half angle of view [deg]: | 37.2 |
| Maximum image height [mm]: | 3.80 |

TABLE 3

ASPHERICAL SURFACE DATA

| Surf. No. | K | A4 | A6 | A8 | A10 | A12 | A14 |
|---|---|---|---|---|---|---|---|
| 1 | −0.950 | 3.21183E−02 | 3.14673E−03 | 1.01081E−02 | −9.49564E−03 | 3.60053E−03 | |
| 2 | 0.000 | −4.97186E−02 | 3.68929E−02 | −2.60349E−02 | 1.29673E−02 | −1.56224E−03 | |
| 3 | −2.180 | −1.73013E−02 | 1.67916E−02 | 1.22310E−02 | −6.35664E−03 | 4.07778E−03 | |
| 4 | 1.740 | 4.34455E−04 | 1.78154E−03 | 8.22195E−02 | −9.88721E−02 | 6.61199E−02 | |
| 5 | 0.000 | −7.18691E−02 | 2.70321E−02 | −2.57057E−02 | 1.54301E−02 | −1.32877E−03 | |
| 6 | 0.000 | −9.44274E−02 | 1.05783E−02 | −1.61976E−02 | 1.58215E−02 | −2.92432E−03 | |
| 7 | −54.580 | −1.37922E−02 | −2.08053E−02 | −1.37670E−02 | 8.94326E−03 | −1.43645E−03 | |
| 8 | −3.740 | −2.24748E−02 | −1.37069E−02 | 8.68116E−03 | −2.02814E−03 | 1.55381E−04 | |
| 9 | −19.840 | −4.28128E−02 | −1.14183E−01 | 8.66318E−02 | −2.63390E−02 | 3.77907E−03 | −2.10977E−04 |
| 10 | −47.820 | −5.25457E−02 | −3.67961E−02 | 2.13394E−02 | −4.23580E−03 | 3.78772E−04 | −1.27844E−05 |
| 11 | −78.710 | −1.56116E−01 | 4.78496E−02 | −6.53124E−03 | 4.39418E−04 | −1.21226E−05 | 1.84368E−08 |
| 12 | −10.980 | −6.31606E−02 | 1.65466E−02 | −2.47654E−03 | 1.61447E−04 | −1.46987E−06 | −1.78947E−07 |

[Numerical Embodiment 2]

FIGS. 3 through 4D and Tables 4 through 6 show a second numerical embodiment of the imaging optical system. FIG. 3 shows a lens arrangement of the second numerical embodiment of the imaging optical system. FIGS. 4A, 4B, 4C and 4D show various aberrations that occurred in the lens arrangement shown in FIG. 3. Table 4 shows the lens surface data, Table 5 shows various data of the imaging optical system, and Table 6 shows aspherical surface data.

The fundamental lens arrangement of the second numerical embodiment is the same as that of the first numerical embodiment except for the following features:

(1) The positive fifth lens element L5P is replaced with a negative fifth lens element L5N.

(2) The diaphragm S is provided on a plane that is orthogonal to the optical axis and contacts the surface of the first lens element L1P on the image side.

TABLE 4

LENS SURFACE DATA

| Surf. No. | R | D | N(d) | v(d) |
|---|---|---|---|---|
| 1 | 1.783 | 0.84 | 1.49710 | 81.6 |
| 2 (Diaphragm) | 10.242 ∞ | 0.00 0.11 | | |

TABLE 4-continued

LENS SURFACE DATA

| Surf. No. | R | D | N(d) | v(d) |
|---|---|---|---|---|
| 3 | 2.817 | 0.25 | 2.00178 | 19.3 |
| 4 | 2.285 | 0.66 | | |
| 5 | −57.342 | 0.41 | 1.54358 | 55.7 |
| 6 | 12.072 | 0.15 | | |
| 7 | 5.424 | 0.36 | 1.54358 | 55.7 |
| 8 | −109.050 | 0.36 | | |
| 9 | −279.680 | 0.53 | 1.60641 | 23.9 |
| 10 | 253.920 | 0.12 | | |
| 11 | 2.693 | 0.64 | 1.54358 | 55.7 |
| 12 | 1.353 | 0.43 | | |
| 13 | ∞ | 0.21 | 1.51680 | 64.2 |
| 14 | ∞ | 0.35 | | |

TABLE 5

IMAGING OPTICAL SYSTEM DATA

| | |
|---|---|
| Focal length of imaging optical system [mm]: | 4.80 |
| f-number | 2.0 |
| Half angle of view [deg]: | 37.5 |
| Maximum image height [mm]: | 3.80 |

TABLE 6

ASPHERICAL SURFACE DATA

| Surf. No. | K | A4 | A6 | A8 | A10 | A12 | A14 |
|---|---|---|---|---|---|---|---|
| 1 | −0.640 | 6.68646E−03 | 1.41491E−03 | −6.63094E−03 | 4.04931E−03 | −2.12962E−03 | |
| 2 | 0.000 | −7.24173E−02 | 7.90472E−02 | −7.24825E−02 | 3.39585E−02 | −7.35998E−03 | |
| 3 | −1.200 | −4.20543E−02 | 6.37923E−02 | −2.93130E−02 | 1.07067E−02 | −1.58091E−04 | |
| 4 | 2.550 | −3.70221E−02 | 1.57799E−02 | 3.00567E−02 | −3.88320E−02 | 1.69941E−02 | |
| 5 | 0.000 | −5.63500E−02 | −4.53111E−03 | 1.70550E−02 | −1.38230E−02 | 5.20595E−03 | |
| 6 | 0.000 | −8.87993E−02 | −1.90934E−02 | −1.71206E−04 | 7.70437E−03 | −1.20274E−03 | |
| 7 | 0.000 | −1.70320E−02 | −4.70317E−02 | −9.86428E−03 | 9.75000E−03 | −1.28911E−03 | |
| 8 | 0.000 | 1.40209E−02 | −4.73063E−02 | 8.94713E−03 | 2.46500E−03 | −6.10000E−04 | |
| 9 | 0.000 | 5.17961E−02 | −1.44315E−01 | 8.15019E−02 | −2.40731E−02 | 3.96456E−03 | −2.82333E−04 |
| 10 | 0.000 | 1.32072E−02 | −6.57207E−02 | 2.93835E−02 | −6.22187E−03 | 6.78766E−04 | −3.02496E−05 |
| 11 | −45.200 | −1.53977E−01 | 4.46199E−02 | −5.96722E−03 | 4.26724E−04 | −1.51912E−05 | 1.80080E−07 |
| 12 | −10.100 | −5.52598E−02 | 1.27355E−02 | −1.66877E−03 | 7.90401E−05 | 1.54248E−06 | −1.78769E−07 |

[Numerical Embodiment 3]

Figure 5:
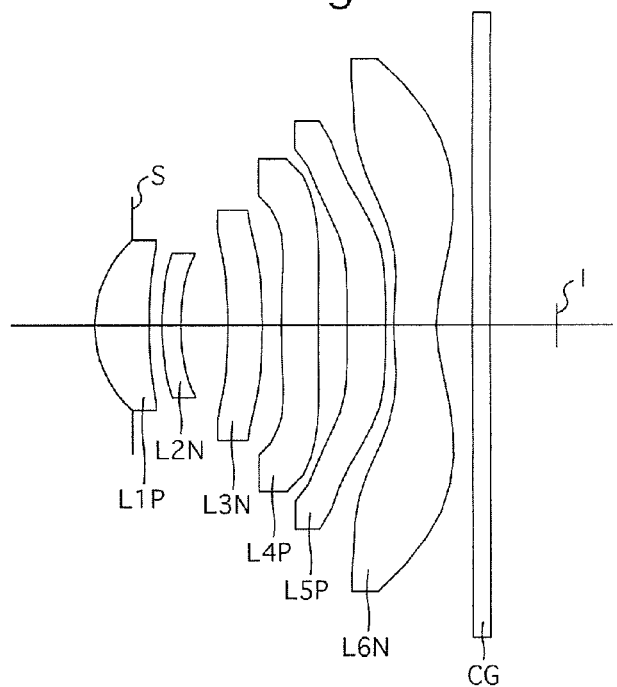
FIG. 5 shows a lens arrangement of a third numerical embodiment of the imaging optical system.
Figure 6A:
FIGS. 6A, 6B, 6C and 6D show various aberrations that occurred in the lens arrangement of FIG. 5.
Figure 6B:
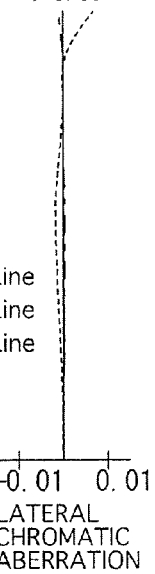
Figure 6C:
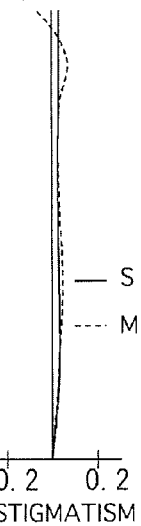
Figure 6D:
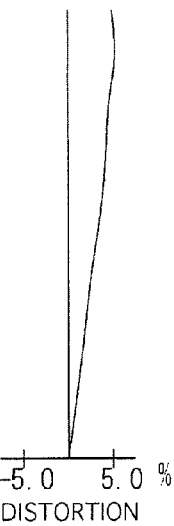

FIGS. 5 through 6D and Tables 7 through 9 show a third numerical embodiment of the imaging optical system. FIG. 5 shows a lens arrangement of the third numerical embodiment of the imaging optical system. FIGS. 6A, 6B, 6C and 6D show various aberrations that occurred in the lens arrangement shown in FIG. 5. Table 7 shows the lens surface data, Table 8 shows various data of the imaging optical system, and Table 9 shows aspherical surface data.

The fundamental lens arrangement of the third numerical embodiment is the same as that of the first numerical embodiment.

[Numerical Embodiment 4]

Figure 7:
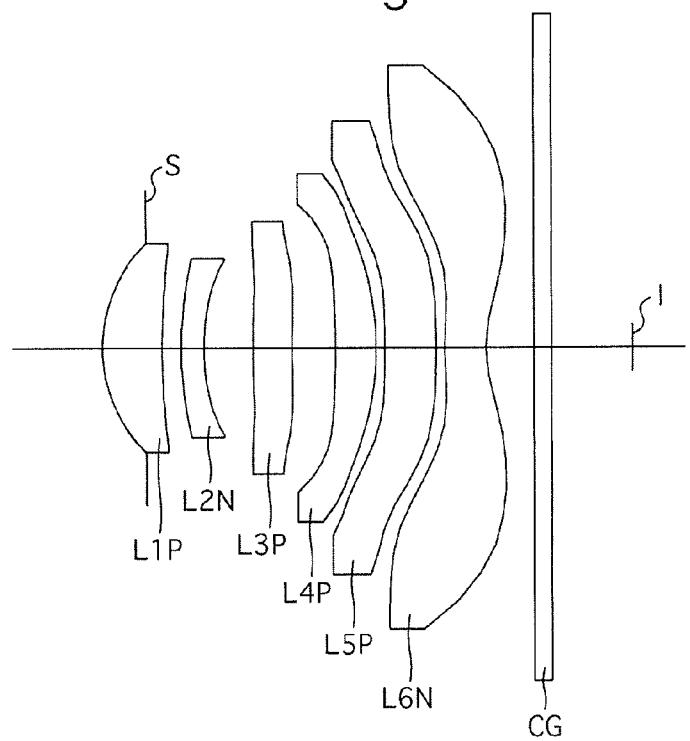
FIG. 7 shows a lens arrangement of a fourth numerical embodiment of the imaging optical system.
Figure 8A:
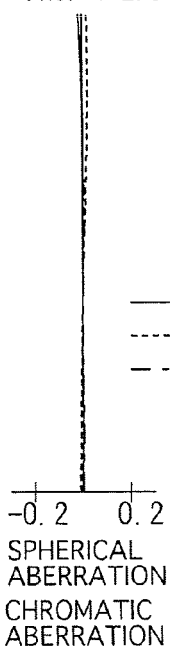
FIGS. 8A, 8B, 8C and 8D show various aberrations that occurred in the lens arrangement of FIG. 7.
Figure 8B:
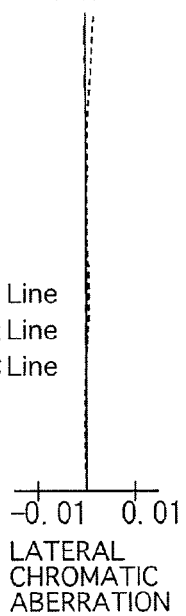
Figure 8C:
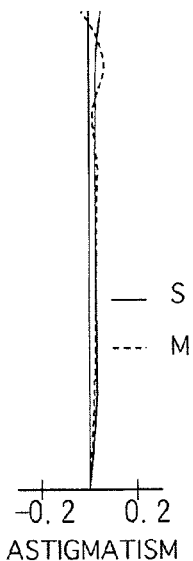
Figure 8D:
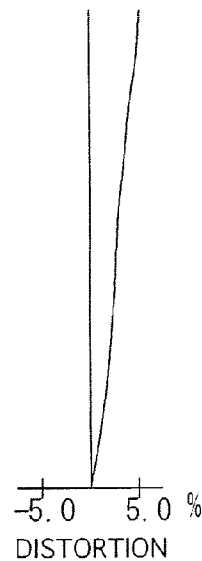

FIGS. 7 through 8D and Tables 10 through 12 show a fourth numerical embodiment of the imaging optical system. FIG. 7 shows a lens arrangement of the fourth numerical embodiment of the imaging optical system. FIGS. 8A, 8B, 8C and 8D show various aberrations that occurred in the lens arrangement shown in FIG. 7. Table 10 shows the lens surface data, Table 11 shows various data of the imaging optical system, and Table 12 shows aspherical surface data.

The fundamental lens arrangement of the fourth numerical embodiment is the same as that of the first numerical embodiment except for the following features:

(1) The negative third lens element L3N is replaced with a positive third lens element L3P.

(2) The negative second lens element L2N is formed of a plastic lens element having an aspherical surface on both sides thereof instead of glass molded lens element.

TABLE 7

LENS SURFACE DATA

| Surf. No. | R | D | N(d) | ν(d) |
|---|---|---|---|---|
| (Diaphragm) | ∞ | −0.44 | | |
| 1 | 1.443 | 0.63 | 1.49710 | 81.6 |
| 2 | 5.469 | 0.15 | | |
| 3 | 3.550 | 0.22 | 2.00178 | 19.3 |
| 4 | 2.770 | 0.56 | | |
| 5 | −9.091 | 0.42 | 1.54358 | 55.7 |
| 6 | −13.455 | 0.24 | | |
| 7 | 11.874 | 0.45 | 1.54358 | 55.7 |
| 8 | 75.764 | 0.35 | | |
| 9 | 45.952 | 0.47 | 1.63548 | 23.9 |
| 10 | 73.287 | 0.10 | | |
| 11 | 2.602 | 0.52 | 1.54358 | 55.7 |
| 12 | 1.426 | 0.44 | | |
| 13 | ∞ | 0.21 | 1.51680 | 64.2 |
| 14 | ∞ | 0.34 | | |

TABLE 8

IMAGING OPTICAL SYSTEM DATA

| | |
|---|---|
| Focal length of imaging optical system [mm]: | 4.60 |
| f-number | 2.2 |
| Half angle of view [deg]: | 38.2 |
| Maximum image height [mm]: | 3.80 |

TABLE 10

LENS SURFACE DATA

| Surf. No. | R | D | N(d) | ν(d) |
|---|---|---|---|---|
| (Diaphragm) | ∞ | −0.49 | | |
| 1 | 1.675 | 0.67 | 1.49710 | 81.6 |
| 2 | 8.362 | 0.21 | | |
| 3 | 3.820 | 0.25 | 1.64250 | 22.5 |
| 4 | 2.426 | 0.55 | | |
| 5 | 9.000 | 0.44 | 1.54358 | 55.7 |
| 6 | 16.386 | 0.49 | | |
| 7 | −8.622 | 0.46 | 1.54358 | 55.7 |
| 8 | −3.367 | 0.10 | | |
| 9 | −16.461 | 0.59 | 1.63548 | 23.9 |
| 10 | −11.168 | 0.10 | | |
| 11 | 2.943 | 0.47 | 1.54358 | 55.7 |
| 12 | 1.255 | 0.54 | | |
| 13 | ∞ | 0.21 | 1.51680 | 64.2 |
| 14 | ∞ | 0.39 | | |

TABLE 11

IMAGING OPTICAL SYSTEM DATA

| | |
|---|---|
| Focal length of imaging optical system [mm]: | 4.82 |
| f-number | 2.0 |
| Half angle of view [deg]: | 36.9 |
| Maximum image height [mm]: | 3.80 |

TABLE 9

ASPHERICAL SURFACE DATA

| Surf. No. | K | A4 | A6 | A8 | A10 | A12 | A14 |
|---|---|---|---|---|---|---|---|
| 1 | −0.640 | 2.45464E−02 | 1.61850E−02 | 1.36204E−02 | −2.70196E−02 | 1.91114E−02 | |
| 2 | 0.000 | −1.92378E−02 | 5.17646E−02 | −8.52691E−02 | 8.05386E−02 | −2.29711E−02 | |
| 3 | −1.000 | 1.33670E−04 | 5.68104E−02 | −9.99003E−02 | 1.33200E−01 | −6.05658E−02 | |
| 4 | 1.900 | 1.02231E−02 | 1.00893E−01 | −1.51655E−01 | 1.96161E−01 | −5.40377E−02 | |
| 5 | −30.000 | −6.12335E−02 | 1.67148E−02 | −6.08669E−03 | 6.09407E−03 | 1.93812E−03 | |
| 6 | −26.000 | −4.31565E−02 | −4.24956E−02 | 3.15261E−02 | 2.61258E−03 | −2.73656E−03 | |
| 7 | 0.000 | 1.33590E−02 | −4.44689E−02 | −1.10441E−03 | 4.28662E−03 | −7.41290E−04 | |
| 8 | 0.000 | −3.39336E−03 | −3.21559E−03 | −5.65026E−03 | 2.81949E−03 | −3.92578E−04 | |
| 9 | −5.250 | −3.37622E−02 | −1.09649E−01 | 8.23252E−02 | −2.40700E−02 | 3.30261E−03 | −1.81479E−04 |
| 10 | −32.500 | −7.75355E−02 | −2.32723E−02 | 2.03913E−02 | −4.37148E−03 | 3.84493E−04 | −1.21688E−05 |
| 11 | −70.820 | −1.38043E−01 | 4.23580E−02 | −5.70351E−03 | 3.90592E−04 | −1.31907E−05 | 1.72094E−07 |
| 12 | −11.430 | −4.10702E−02 | 8.78943E−03 | −1.29880E−03 | 6.46331E−05 | 3.26707E−06 | −2.94627E−07 |

TABLE 12

ASPHERICAL SURFACE DATA

| Surf. No. | K | A4 | A6 | A8 | A10 | A12 | A14 |
|---|---|---|---|---|---|---|---|
| 1 | −0.640 | 1.90877E−02 | −4.68620E−02 | 1.46963E−02 | −1.01846E−02 | 3.56775E−03 | |
| 2 | 0.000 | −3.33984E−02 | 4.32999E−02 | −3.27279E−02 | 1.58276E−02 | −2.78498E−03 | |
| 3 | −1.750 | −7.24481E−02 | 6.58266E−02 | 3.18460E−03 | −2.42167E−02 | 8.80685E−03 | |
| 4 | 3.070 | −7.37383E−02 | 2.43895E−02 | 9.02151E−03 | −1.11261E−01 | 4.21215E−02 | |
| 5 | 0.000 | −7.56042E−02 | 3.12918E−02 | −3.19518E−02 | 2.51205E−02 | −4.83947E−03 | |
| 6 | −22.870 | −6.71573E−02 | 1.27784E−02 | −2.62076E−02 | 2.02873E−02 | −3.50663E−03 | |
| 7 | 0.000 | 1.97310E−02 | −2.32397E−03 | −2.94036E−02 | 1.25785E−02 | −1.62348E−03 | |
| 8 | 0.000 | −5.88033E−03 | −3.83692E−03 | 7.49493E−03 | −2.20751E−03 | 1.69582E−04 | |
| 9 | −13.240 | −2.65521E−02 | −1.06748E−01 | 8.45845E−02 | −2.64573E−02 | 3.91967E−03 | −2.30624E−04 |
| 10 | −15.980 | −2.34820E−02 | −3.85315E−02 | 2.05920E−02 | −4.06113E−03 | 3.74246E−04 | −1.38572E−05 |
| 11 | −98.100 | −1.54610E−01 | 4.79410E−02 | −6.54468E−03 | 4.39606E−04 | −1.18843E−05 | −1.31626E−08 |
| 12 | −8.590 | −6.10243E−02 | 1.65323E−02 | −2.61778E−03 | 1.94872E−04 | −4.85443E−06 | −5.65870E−08 |

[Numerical Embodiment 5]

Figures 9, 10A, 10B, 10C, 10D:
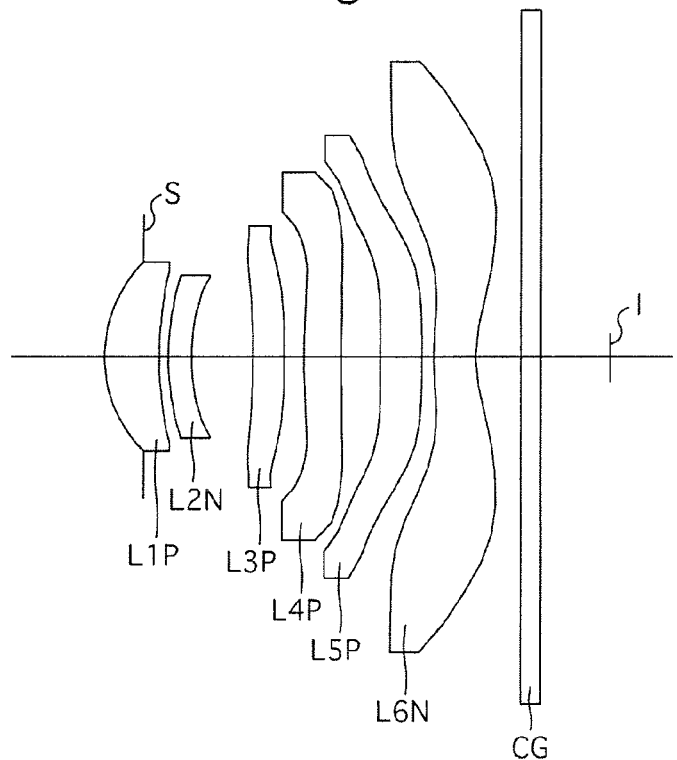

FIGS. 9 through 10D and Tables 13 through 15 show a fifth numerical embodiment of the imaging optical system. FIG. 9 shows a lens arrangement of the fifth numerical embodiment of the imaging optical system. FIGS. 10A, 10B, 10C and 10D show various aberrations that occurred in the lens arrangement shown in FIG. 9. Table 13 shows the lens surface data, Table 14 shows various data of the imaging optical system, and Table 15 shows aspherical surface data.

The fundamental lens arrangement of the fifth numerical embodiment is the same as that of the first numerical embodiment except for the following feature:

(1) The negative third lens element L3N is replaced with a positive third lens element L3P.

TABLE 13

LENS SURFACE DATA

| Surf. No. | R | D | N(d) | ν(d) |
|---|---|---|---|---|
| (Diaphragm) | ∞ | −0.42 | | |
| 1 | 1.504 | 0.59 | 1.55532 | 71.6 |
| 2 | 3.609 | 0.10 | | |
| 3 | 2.946 | 0.25 | 2.00178 | 19.3 |
| 4 | 2.399 | 0.67 | | |
| 5 | −16.618 | 0.35 | 1.54358 | 55.7 |
| 6 | −13.498 | 0.22 | | |
| 7 | 9.630 | 0.41 | 1.54358 | 55.7 |
| 8 | 35.572 | 0.43 | | |
| 9 | 30.645 | 0.45 | 1.63548 | 23.9 |
| 10 | 117.699 | 0.13 | | |
| 11 | 2.374 | 0.46 | 1.53110 | 55.9 |
| 12 | 1.379 | 0.49 | | |
| 13 | ∞ | 0.21 | 1.51680 | 64.2 |
| 14 | ∞ | 0.34 | | |

TABLE 14

IMAGING OPTICAL SYSTEM DATA

| | |
|---|---|
| Focal length of imaging optical system [mm]: | 4.59 |
| f-number | 2.2 |
| Half angle of view [deg]: | 38.3 |
| Maximum image height [mm]: | 3.80 |

TABLE 15

ASPHERICAL SURFACE DATA

| Surf. No. | K | A4 | A6 | A8 | A10 | A12 | A14 |
|---|---|---|---|---|---|---|---|
| 1 | −0.640 | 2.89468E−02 | −1.07341E−02 | 7.33377E−02 | −8.61803E−02 | 4.17985E−02 | |
| 2 | 0.000 | −5.94434E−02 | 8.09667E−02 | −7.37515E−02 | 3.32633E−02 | 1.08853E−02 | |
| 3 | −1.000 | −3.29128E−02 | 7.60769E−02 | −8.75880E−02 | 7.53108E−02 | −2.43250E−02 | |
| 4 | 1.900 | 3.03344E−03 | 6.08468E−02 | −2.58921E−02 | 1.32234E−02 | 2.35745E−02 | |
| 5 | −30.000 | −5.19225E−02 | 2.48737E−02 | −7.75943E−03 | 1.62383E−02 | −5.54746E−03 | |
| 6 | −26.000 | −6.02617E−02 | −2.55784E−02 | 1.87139E−02 | 1.08575E−02 | −4.37624E−03 | |
| 7 | 0.000 | 8.74223E−03 | −4.01810E−02 | 4.45328E−04 | 3.83110E−03 | −8.35642E−04 | |
| 8 | 0.000 | 3.95625E−03 | −1.40194E−03 | −6.60757E−03 | 2.91443E−03 | −3.92864E−04 | |
| 9 | −5.250 | −3.37622E−02 | −1.09649E−01 | 8.23252E−02 | −2.40700E−02 | 3.30261E−03 | −1.81479E−04 |
| 10 | −32.500 | −7.75355E−02 | −2.32723E−02 | 2.03913E−02 | −4.37148E−03 | 3.84493E−04 | −1.21688E−05 |
| 11 | −58.500 | −1.34033E−01 | 4.01033E−02 | −5.29899E−03 | 3.64007E−04 | −1.27116E−05 | 1.72094E−07 |
| 12 | −10.800 | −3.66260E−02 | 6.24439E−03 | −8.87879E−04 | 4.28814E−05 | 3.52548E−06 | −2.94627E−07 |

[Numerical Embodiment 6]

Figure 11:
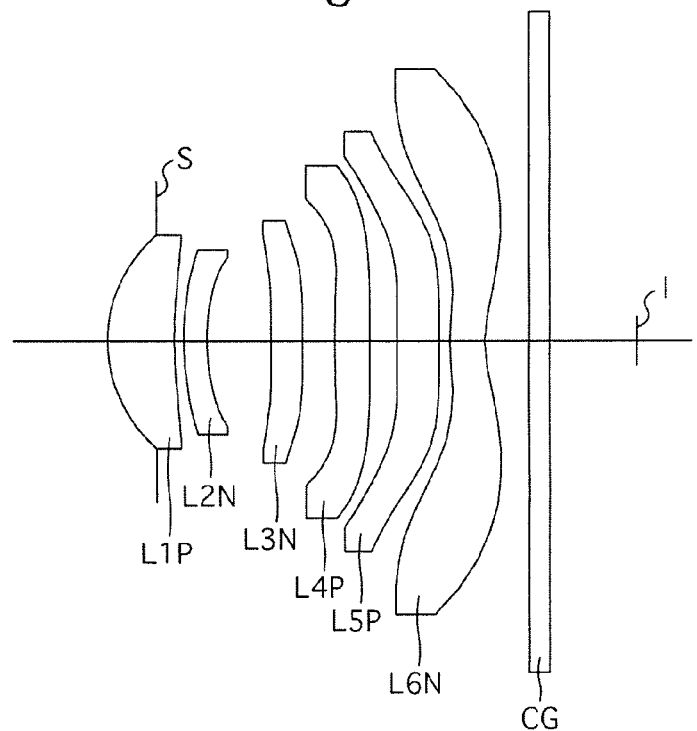
FIG. 11 shows a lens arrangement of a sixth numerical embodiment of the imaging optical system.
Figure 12A:
FIGS. 12A, 12B, 12C and 12D show various aberrations that occurred in the lens arrangement of FIG. 11.
Figure 12B:
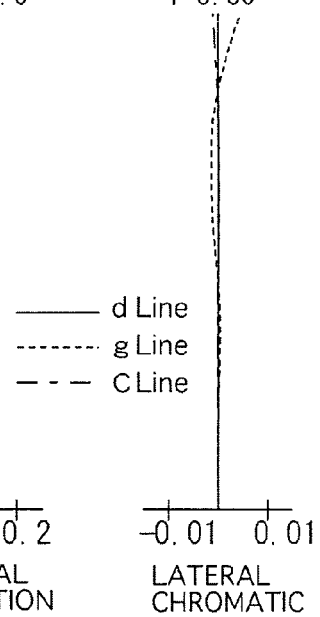
Figure 12C:
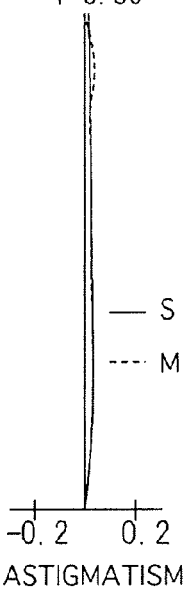
Figure 12D:
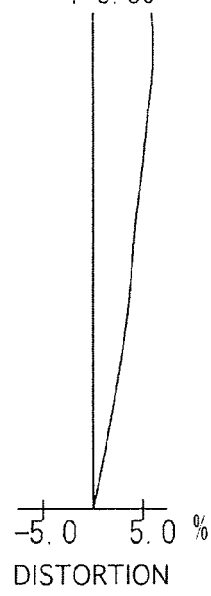

FIGS. 11 through 12D and Tables 16 through 18 show a sixth numerical embodiment of the imaging optical system. FIG. 11 shows a lens arrangement of the sixth numerical embodiment of the imaging optical system. FIGS. 12A, 12B, 12C and 12D show various aberrations that occurred in the lens arrangement shown in FIG. 11. Table 16 shows the lens surface data, Table 17 shows various data of the imaging optical system, and Table 18 shows aspherical surface data.

The fundamental lens arrangement of the sixth numerical embodiment is the same as that of the first numerical embodiment.

TABLE 16

LENS SURFACE DATA

| Surf. No. | R | D | N(d) | ν(d) |
|---|---|---|---|---|
| (Diaphragm) | ∞ | −0.52 | | |
| 1 | 1.547 | 0.71 | 1.49710 | 81.6 |
| 2 | 4.571 | 0.10 | | |
| 3 | 2.859 | 0.25 | 1.82115 | 24.1 |

TABLE 16-continued

LENS SURFACE DATA

| Surf. No. | R | D | N(d) | v(d) |
|---|---|---|---|---|
| 4 | 2.337 | 0.70 | | |
| 5 | −153.142 | 0.35 | 1.54358 | 55.7 |
| 6 | −4176.000 | 0.35 | | |
| 7 | 8.326 | 0.39 | 1.54358 | 55.7 |
| 8 | −666.660 | 0.31 | | |
| 9 | 88.417 | 0.46 | 1.65348 | 23.9 |
| 10 | 245.127 | 0.12 | | |
| 11 | 2.547 | 0.38 | 1.53484 | 55.7 |
| 12 | 1.409 | 0.48 | | |
| 13 | ∞ | 0.21 | 1.51680 | 64.2 |
| 14 | ∞ | 0.39 | | |

TABLE 17

IMAGING OPTICAL SYSTEM DATA

| | |
|---|---|
| Focal length of imaging optical system [mm]: | 4.74 |
| f-number | 2.0 |
| Half angle of view [deg]: | 37.1 |
| Maximum image height [mm]: | 3.80 |

TABLE 18

ASPHERICAL SURFACE DATA

| Surf. No. | K | A4 | A6 | A8 | A10 | A12 | A14 |
|---|---|---|---|---|---|---|---|
| 1 | −0.638 | 2.51139E−02 | −3.63386E−03 | 1.32900E−02 | −7.71279E−03 | 1.97803E−03 | |
| 2 | 0.000 | −7.95221E−02 | 4.37704E−02 | 3.93490E−03 | −1.71813E−02 | 6.48593E−03 | |
| 3 | −1.000 | −6.27650E−02 | 5.47239E−03 | 9.33213E−02 | −8.35396E−02 | 2.74216E−02 | |
| 4 | 1.890 | −1.55203E−02 | −4.68710E−02 | 2.19660E−01 | −2.33209E−01 | 1.11887E−01 | |
| 5 | 0.000 | −8.15542E−02 | 3.80900E−02 | −3.35865E−02 | 2.28676E−02 | −3.52597E−03 | |
| 6 | −25.200 | −1.12462E−01 | 3.25719E−02 | −3.07004E−02 | 2.44635E−02 | −4.69688E−03 | |
| 7 | 0.000 | −4.63028E−02 | 4.25173E−03 | −3.18890E−02 | 1.54249E−02 | −2.17794E−03 | |
| 8 | 0.000 | −9.91154E−03 | −2.05615E−02 | 1.00582E−02 | −1.98308E−02 | 1.14744E−04 | |
| 9 | −5.250 | −1.00596E−02 | −1.18042E−01 | 8.51807E−02 | −2.63969E−02 | 3.94037E−03 | −2.32281E−04 |
| 10 | −30.000 | −3.95957E−02 | −3.74162E−02 | 2.03739E−02 | −4.02267E−03 | 3.78066E−04 | −1.47354E−05 |
| 11 | −76.800 | −1.50707E−01 | 4.70937E−02 | −6.51887E−03 | 4.41444E−04 | −1.18683E−05 | −1.15281E−08 |
| 12 | −11.840 | −6.11600E−02 | 1.65534E−02 | −2.66034E−03 | 2.01267E−04 | −4.64913E−06 | −9.29383E−08 |

The numerical values of each condition for each of the first through sixth numerical embodiments are shown in Table 19.

TABLE 19

| | Embod. 1 | Embod. 2 | Embod. 3 |
|---|---|---|---|
| Cond. (1) | 0.954 | 0.956 | 1.020 |
| Cond. (2) | −0.514 | −0.703 | −0.582 |
| Cond. (3) | −0.242 | −0.266 | −0.256 |
| Cond. (4) | 0.099 | 0.104 | 0.123 |
| Cond. (5) | 2.00 | 2.00 | 2.00 |
| Cond. (6) | 62.2 | 62.2 | 62.2 |
| Cond. (7) | 81.6 | 81.6 | 81.6 |
| Cond. (8) | −0.86 | −0.80 | −0.67 |
| Cond. (9) | 0.079 | 0.133 | 0.113 |
| Cond. (10) | 0.313 | 0.504 | 0.178 |
| Cond. (11) | 0.148 | 0.138 | 0.122 |
| Cond. (12) | 0.691 | 0.713 | 0.678 |
| | Embod. 4 | Embod. 5 | Embod. 6 |
| Cond. (1) | 0.877 | 0.911 | 0.942 |
| Cond. (2) | −0.666 | −0.412 | −0.494 |
| Cond. (3) | −0.366 | −0.253 | −0.219 |
| Cond. (4) | 0.223 | 0.102 | 0.100 |
| Cond. (5) | 1.64 | 2.00 | 1.82 |

TABLE 19-continued

| Cond. (6) | 59.1 | 52.3 | 57.5 |
|---|---|---|---|
| Cond. (7) | 81.6 | 71.6 | 81.6 |
| Cond. (8) | −1.08 | −0.62 | −0.71 |
| Cond. (9) | 0.098 | 0.100 | 0.080 |
| Cond. (10) | 0.489 | 0.190 | 0.313 |
| Cond. (11) | 0.114 | 0.146 | 0.148 |
| Cond. (12) | 0.720 | 0.671 | 0.684 |

As can be understood from Table 19, the first through sixth embodiments satisfy conditions (1) through (2). Furthermore, as can be understood from the aberration diagrams, the various aberrations are suitably corrected.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An imaging optical system comprising a positive first lens element having a convex surface on an object side of said first lens element, a negative second lens element having a concave surface on an image side of said second lens element, a third lens element, a positive fourth lens element, a fifth lens element, and a negative sixth lens element provided with at least one aspherical surface that has inflection points other than at an optical axis thereof, in that order from an object side of the imaging optical system, wherein the following conditions are satisfied:

$$0.86 < f/f12 < 1.20;$$

$$-0.71 < (r11-r12)/(r11+r12) < -0.20;$$

$$-0.45 < f1/f2 < -0.10; \text{ and}$$

$$0.05 < (r21-r22)/(r21+r22) < 0.30,$$

f designates a focal length of said imaging optical system,
f1 designates a focal length of said first lens element,
f2 designates a focal length of said second lens element,
f12 designates a combined focal length of said first lens element and said second lens element,
r11 designates a radius of curvature of a surface on the object side of said first lens element,
r12 designates a radius of curvature of a surface on an image side of said first lens element,
r21 designates a radius of curvature of a surface on an object side of said second lens element, and r22 designates a radius of curvature of a surface on the image side of said second lens element.

2. The imaging optical system according to claim 1, wherein the following condition is satisfied:

$-2.5<f/f6<-0.4$, and f6 designates a focal length of said sixth lens element.

3. The imaging optical system according to claim 1, wherein the following condition is satisfied:

$0.05<d6/f<0.18$, and d6 designates a lens thickness of said sixth lens element.

4. The imaging optical system according to claim 1, wherein the following condition is satisfied:

$0.15<f/f4<0.55$, and f4 designates a focal length of said fourth lens element.

5. The imaging optical system according to claim 1, wherein the following condition is satisfied:

$0.1<d23/f<0.2$, and d23 designates a distance between said second lens element and said third lens element.

6. The imaging optical system according to claim 1, wherein
said first lens element comprises a glass molded lens element, on which an aspherical surface is provided on each side, and
each of said second through sixth lens elements comprise a plastic lens element, on which an aspherical surface is provided on each side.

7. The imaging optical system according to claim 1, wherein
each of said first lens element and said second lens element comprises a glass molded lens element, on which an aspherical surface is provided on each side, and
each of said third through sixth lens elements comprise a plastic lens element, on which an aspherical surface is provided on each side.

8. The imaging optical system according to claim 1, wherein the following condition is satisfied:

$TL/(2*Ymax)<0.75$,

TL designates a distance from the surface on the object side on said first lens element to an imaging plane, and
Ymax designates a maximum image height.

9. An imaging optical system comprising a positive first lens element having a convex surface on an object side of said first lens element, a negative second lens element having a concave surface on an image side of said second lens element, a third lens element, a positive fourth lens element, a fifth lens element, and a negative sixth lens element provided with at least one aspherical surface that has inflection points other than at an optical axis thereof, in that order from an object side of the imaging optical system, wherein
the following conditions are satisfied:

$0.86<f/f12<1.20$;

$-0.71<(r11-r12)/(r11+r12)<-0.20$; and $n2>1.8$, f designates a focal length of said imaging optical system,
f12 designates a combined focal length of said first lens element and said second lens element,
r11 designates a radius of curvature of a surface on the object side of said first lens element,
r12 designates a radius of curvature of a surface on an image side of said first lens element, and
n2 designates a refractive index at a d-line of said second lens element.

10. An imaging optical system comprising a positive first lens element having a convex surface on an object side of said first lens element, a negative second lens element having a concave surface on an image side of said second lens element, a third lens element, a positive fourth lens element, a fifth lens element, and a negative sixth lens element provided with at least one aspherical surface that has inflection points other than at an optical axis thereof, in that order from an object side of the imaging optical system, wherein
the following conditions are satisfied:

$0.86<f/f12<1.20$;

$-0.71<(r11-r12)/(r11+r12)<-0.20$; and $35<vd1-vd2<80$, f designates a focal length of said imaging optical system,
f12 designates a combined focal length of said first lens element and said second lens element,
r11 designates a radius of curvature of a surface on the object side of said first lens element,
r12 designates a radius of curvature of a surface on an image side of said first lens element,
vd1 designates an Abbe number with respect to a d-line of said first lens element, and
vd2 designates an Abbe number with respect to a d-line of said second lens element.

11. An imaging optical system comprising a positive first lens element having a convex surface on an object side of said first lens element, a negative second lens element having a concave surface on an image side of said second lens element, a third lens element, a positive fourth lens element, a fifth lens element, and a negative sixth lens element provided with at least one aspherical surface that has inflection points other than at an optical axis thereof, in that order from an object side of the imaging optical system, wherein
the following conditions are satisfied:

$0.86<f/f12<1.20$;

$-0.71<(r11-r12)/(r11+r12)<-0.20$; and $vd1>60$, f designates a focal length of said imaging optical system,
f12 designates a combined focal length of said first lens element and said second lens element,
r11 designates a radius of curvature of a surface on the object side of said first lens element,
r12 designates a radius of curvature of a surface on an image side of said first lens element, and
vd1 designates an Abbe number with respect to a d-line of said first lens element.

* * * * *